US010359924B2

(12) United States Patent
Adams (10) Patent No.: US 10,359,924 B2
(45) Date of Patent: Jul. 23, 2019

(54) CONTROL OF AN ELECTRONIC DEVICE INCLUDING DISPLAY AND KEYBOARD MOVEABLE RELATIVE TO THE DISPLAY (71) Applicant: BlackBerry Limited, Waterloo (CA)

(72) Inventor: Neil Patrick Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 63 days.

(21) Appl. No.: 15/141,473

(22) Filed: Apr. 28, 2016

(65) Prior Publication Data
US 2017/0315711 A1 Nov. 2, 2017

(51) Int. Cl.
G09G 5/00 (2006.01)
G06F 3/0484 (2013.01)
G06F 1/16 (2006.01)
G06F 3/0338 (2013.01)
G06F 3/0488 (2013.01)
G06F 3/16 (2006.01)
H04M 1/02 (2006.01)

(52) U.S. Cl.
CPC ........ G06F 3/04847 (2013.01); G06F 1/1624 (2013.01); G06F 1/1666 (2013.01); G06F 1/1677 (2013.01); G06F 3/0338 (2013.01); G06F 3/0488 (2013.01); G06F 3/04883 (2013.01); G06F 3/165 (2013.01); H04M 1/0237 (2013.01); H04M 1/0241 (2013.01)

(58) Field of Classification Search
USPC ........ 345/157, 158, 168, 169, 173; 715/773, 715/845, 863; 455/566; 714/48
See application file for complete search history.

(56) References Cited

U.S. PATENT DOCUMENTS

| 8,593,405 | B2 * | 11/2013 | Kuo | G06F 3/04886 345/168 |
| 8,977,987 | B1 * | 3/2015 | Korn | G06F 3/016 715/863 |
| 2008/0224999 | A1 * | 9/2008 | Yoshioka | G06F 3/0236 345/157 |
| 2010/0053088 | A1 * | 3/2010 | Bae | G06F 3/041 345/168 |

(Continued)

FOREIGN PATENT DOCUMENTS

EP 2106103 A1 9/2009
WO 2006005993 A2 1/2006

OTHER PUBLICATIONS

European Patent Application No. 17162040.4, Extended European Search Report dated Sep. 29, 2017.

(Continued)

Primary Examiner — Thuy N Pardo
(74) Attorney, Agent, or Firm — Borden Ladner Gervais LLP; Geoffrey deKleine (57) ABSTRACT A method of controlling an electronic device having a display moveable relative to a keyboard, between a first position in which the keyboard is exposed for use and a second position in which the keyboard is not exposed. The method includes, in response to detecting initiation of control of a position of an adjustable setting within a range, entering a control mode at the electronic device, and, in response to detecting movement of the display relative to the keyboard of the electronic device, adjusting the position of the adjustable setting within the range.

18 Claims, 6 Drawing Sheets (56) References Cited

U.S. PATENT DOCUMENTS

| | | | |
|---|---|---|---|
| 2010/0151846 A1 | 6/2010 | Vuong | |
| 2010/0197353 A1* | 8/2010 | Marui | G06F 3/04886 |
| | | | 455/566 |
| 2010/0178947 A1 | 9/2010 | Kim et al. | |
| 2010/0241983 A1* | 9/2010 | Walline | G06F 1/1626 |
| | | | 715/773 |
| 2011/0053650 A1 | 3/2011 | Chung et al. | |
| 2011/0055639 A1* | 3/2011 | Huang | G06F 3/0233 |
| | | | 714/48 |
| 2012/0268391 A1* | 10/2012 | Somers | G06F 1/1694 |
| | | | 345/173 |
| 2012/0306759 A1* | 12/2012 | Luo | G06F 3/04886 |
| | | | 345/168 |
| 2013/0191785 A1* | 7/2013 | Rampson | G06F 3/0488 |
| | | | 715/845 |
| 2013/0222256 A1* | 8/2013 | Pasquero | G06F 3/04886 |
| | | | 345/169 |
| 2014/0085208 A1* | 3/2014 | Sim | G06F 3/0412 |
| | | | 345/169 |
| 2015/0253870 A1* | 9/2015 | Ikeda | G06F 3/0233 |
| | | | 345/158 |
| 2015/0324117 A1* | 11/2015 | Spetalnick | G06F 3/0236 |
| | | | 345/168 |
| 2017/0003837 A1* | 1/2017 | Shamonsky | G06F 3/04886 |
| | | | 345/169 |

OTHER PUBLICATIONS

European Patent Application No. 17162040.4, Office Action dated Nov. 22, 2018.

\* cited by examiner

CONTROL OF AN ELECTRONIC DEVICE INCLUDING DISPLAY AND KEYBOARD MOVEABLE RELATIVE TO THE DISPLAY

FIELD OF TECHNOLOGY

The present disclosure relates to an electronic device including a display and a keyboard that is moveable relative to the display and to the control of such an electronic device.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), and tablet computers with wireless network communications or near-field communications connectivity such as Bluetooth® capabilities.

Portable electronic devices such as PDAs, or tablet computers are generally intended for handheld use and ease of portability. Displays that are moveable relative to a keyboard, from a position in which the keyboard is hidden to a position in which the keyboard is exposed for use are particularly useful on portable electronic devices, which are small and may have limited space for user input and output.

Improvements in electronic devices with touch-sensitive input devices are desirable.

BRIEF DESCRIPTION OF THE DRAWINGS

Embodiments of the present disclosure will now be described, by way of example only, with reference to the attached figures, in which.

DETAILED DESCRIPTION

The following describes an electronic device including a keyboard and a display moveable relative to the keyboard, between a first position in which the keyboard is exposed for use and a second position in which the keyboard is not exposed, and a method of controlling the electronic device. The method includes, in response to detecting initiation of control of a position of an adjustable setting within a range, entering a control mode at the electronic device, and, in response to detecting movement of the display relative to the keyboard of the electronic device, adjusting the position of the adjustable setting within the range.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth.

Figure 1:
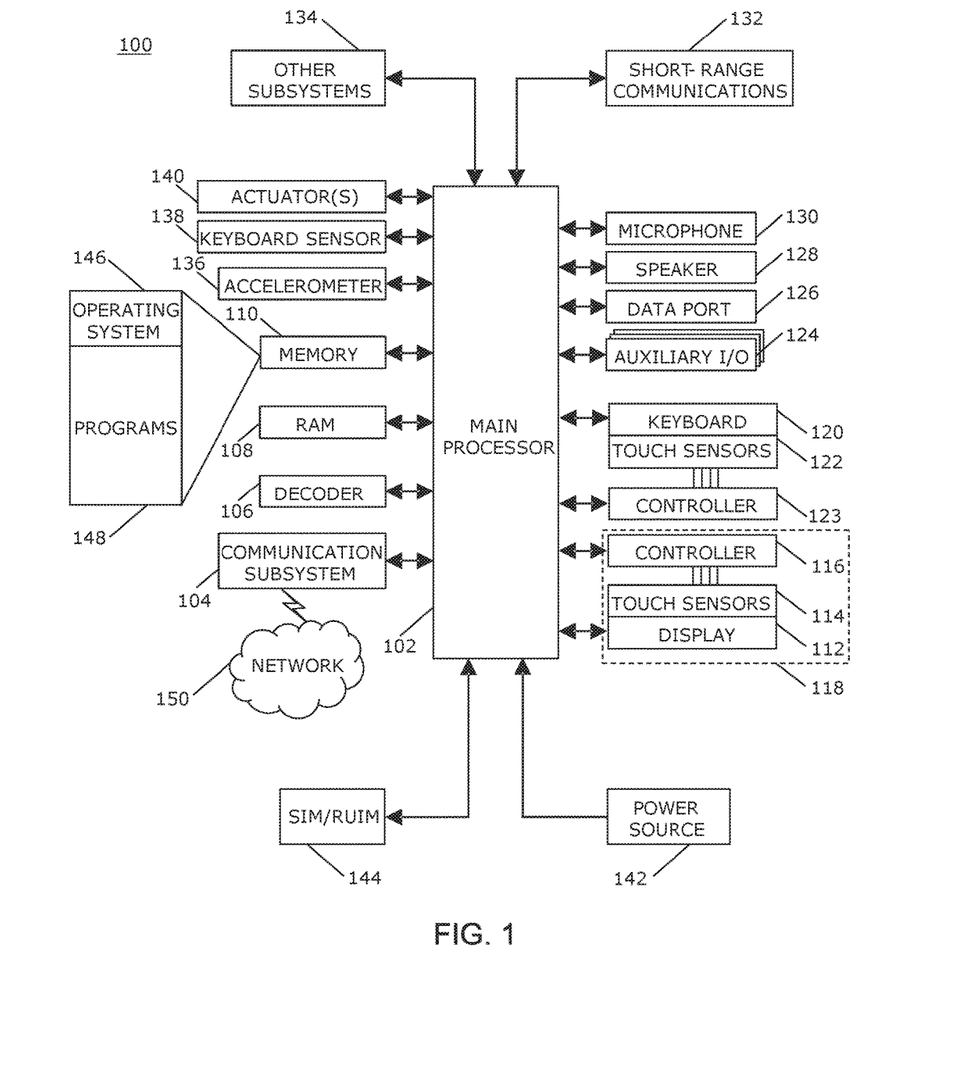
FIG. 1 is a block diagram of an example of a portable electronic device in accordance with the disclosure.

A block diagram of an example of an electronic device 100 is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a physical keyboard 120, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Thus, the touch sensors 114 and the controller 116 are utilized as an input device. Information, such as text, characters, symbols, images, icons, and other items that may be displayed or rendered on a portable electronic device, is displayed on the touch-sensitive display 118 via the processor 102. The keyboard may be, for example, a physical keyboard 120 that includes a plurality of mechanical keys that have mechanical switches or contacts for input to the electronic device 100 when a mechanical key of the keyboard is depressed by a sufficient force to oppose a bias of the mechanical key. In this example, touch sensors 122 are disposed on the physical keyboard 120 and the touch sensors 122 are coupled to a controller 123. Thus, in addition to depression of the mechanical keys of the physical keyboard 120 for input to the portable electronic device 100, touches on the mechanical keys are also detected for input to the processor 102.

The touch-sensitive display 118 is moveable relative to the physical keyboard 120. A keyboard sensor 138 is utilized to detect a location of the touch-sensitive display 118 relative to the physical keyboard 120 of the electronic device 100.

The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 144 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display. A capacitive touch-sensitive display includes capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected. A tap, which is a particular type of touch may be a touch that ends within a threshold period of time. Thus, the touch contact with the touch-sensitive display 118 is relatively short because contact ends within a threshold period of time of beginning.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch sensors 122 on the physical keyboard 120 may be any suitable touch sensors, such as capacitive touch-sensors and may comprise any suitable material, such as indium tin oxide (ITO). Optionally, the touch sensors 122 disposed on the physical keyboard 120 may be coupled to the same controller 116 as the touch sensors of touch-sensitive display 118 such that a single controller is utilized rather than two controllers 116, 123.

One or more touches on the keys of the keyboard 120 may be detected. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

One or more gestures may also be detected by the touch sensors 122 disposed on the keyboard 120. A gesture on the keys of the keyboard 120 may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover.

The touch-sensitive display 118 includes a display area in which information may be displayed, and a non-display area extending around the periphery of the display area. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image is displayed by the display 112 in the non-display area. Touch sensors may be disposed in the non-display area, which touch sensors may be extended from the touch sensors in the display area or distinct or separate touch sensors from the touch sensors in the display area. A touch on the touch-sensitive display 118, including a gesture, may be associated with the display area, the non-display area, or both areas. The touch sensors may extend across substantially the entire non-display area or may be disposed in only part of the non-display area.

Figures 2, 3:
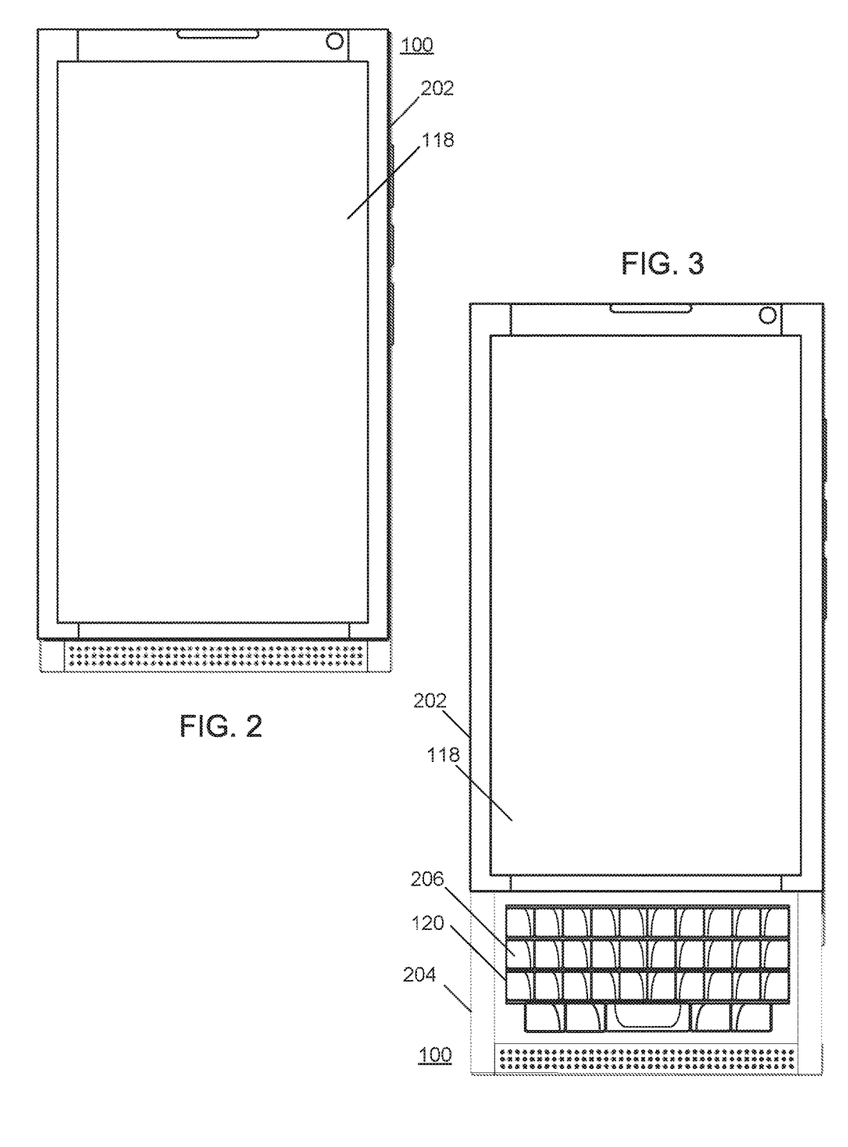
FIG. 2 is a front view of an example of a portable electronic device including a keyboard and a display that is movable relative to the keyboard, with the display in a first position, in accordance with the present disclosure.
FIG. 3 is a front view of an example of the portable electronic device of FIG. 2 with the display in a second position, in accordance with the present disclosure.

A front view of an example of the electronic device 100 is shown in FIG. 2. The electronic device 100 includes a display housing 202 in which the touch-sensitive display 118 is disposed. The display housing 202 is utilized to house or support components including at least some of the components shown in FIG. 1.

The physical keyboard 120 is disposed in a keyboard housing 204, which is shown in FIG. 3, below the touch-sensitive display 118 in the orientation illustrated in FIG. 3. The physical keyboard 120 includes a plurality of mechanical keys 206. Each one of the mechanical keys 206 of the keyboard is associated with characters or a function such that the characters are entered utilizing the mechanical keys 206. The keyboard housing 204 may also be utilized to house or support components including at least some of the components shown in FIG. 1.

To move the touch-sensitive display 118 relative to the physical keyboard 120, display housing 202 is moveable relative to the keyboard housing 204 by sliding the display housing 202 between a first position in which the keyboard housing 204 is stacked with the display housing 202 such that the physical keyboard 120 is disposed between the display housing 202 and a back of the keyboard housing 204, as shown in FIG. 2, and a second position in which the keyboard housing 204 extends from the display housing 202 to expose the physical keyboard 120 below the touch-sensitive display 118 in the orientation in which the portable electronic device 100 is illustrated in FIG. 3.

Thus, touch-sensitive display 118 is moveable relative to the physical keyboard 120, between the first position, shown in FIG. 2, in which the physical keyboard is not exposed and the second position, shown in FIG. 3, in which the physical keyboard 120 is exposed for use. The physical keyboard 120 is therefore selectively exposable for use. The keyboard sensor 138, referred to above with reference to FIG. 1, is arranged and constructed to detect a position of the display housing 202 relative to the keyboard housing 204. The keyboard sensor 138 is coupled to the processor 102 to detect that the touch-sensitive display 118 is in the first position, the second position, or in a location between the first and the second positions. The processor 102 in connection with the keyboard sensor 138 may detect the percentage that the physical keyboard 120 is exposed. Thus, the keyboard sensor 138 together with the processor 102 detects movement of the touch-sensitive display 118 relative to the physical keyboard 120.

The physical keyboard 120 may be a QWERTY keyboard. Alternatively, other keyboard layouts may be successfully implemented, such as an AZERTY keyboard, a QWERTZ keyboard, or any other suitable keyboard.

Information may be displayed on the touch-sensitive display 118. The information displayed may include any suitable information such as icons, text, pictures, video, documents, a webpage, or any other suitable information. The information may be associated with, for example, a home page, a menu or submenu, an application or applications, and so forth. The information may be selectable, for example, by a touch on the touch-sensitive display 118, or by a touch, such as a hover gesture, a tap, a double tap, or other suitable touch, on the physical keyboard 120.

A virtual keyboard may also be displayed. The keys of the virtual keyboard may be selectable by a touch on an area of the touch-sensitive display 118 associated with the respective key. Display of the virtual keyboard may be discontinued in response to movement of the display housing 202 relative to the keyboard housing 204 to the second position, as shown in FIG. 3, to thereby expose the physical keyboard 120.

Figure 4:
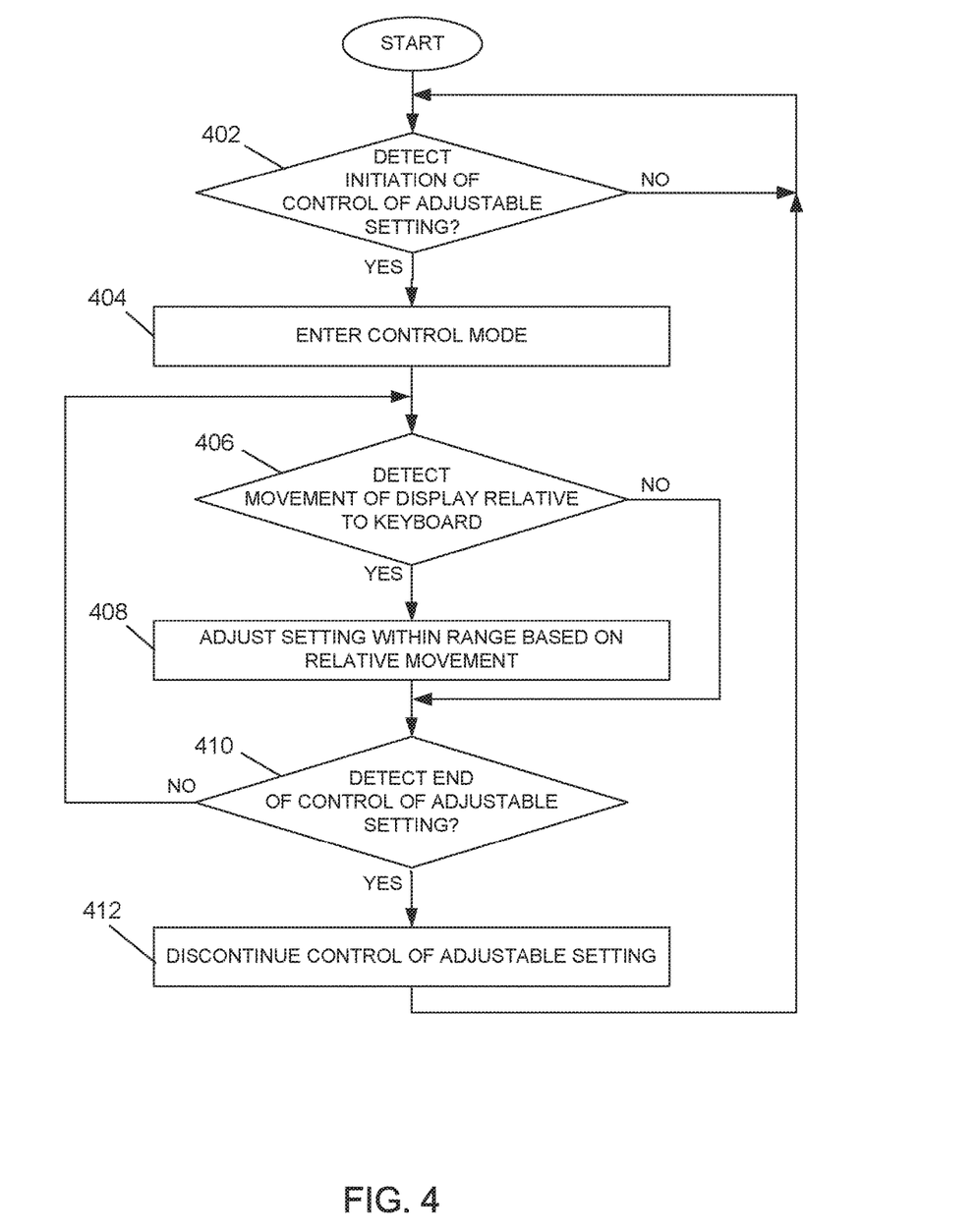
FIG. 4 is a flowchart illustrating an example of a method of controlling an electronic device in accordance with the disclosure.

A flowchart illustrating a method of controlling an electronic device that has a display moveable relative to the keyboard, such as the electronic device 100, is shown in FIG. 4. The method may be carried out by software executed, for example, by a processor 102 in a portable electronic device 100. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable device.

The method illustrated in FIG. 4 may be carried out, for example, any time the portable electronic device 120 is on and is running the operating system or an application.

In response to detecting initiation of control of an adjustable setting within a range at 402, the method continues at 404. Initiation of control of the adjustable setting may be detected by detecting a touch at a location on the touch-sensitive display 118, for example. The location may include information displayed such as a graphical representation, a word or symbol, or any suitable identifier or information. For example, the location may include a graphical representation of a button, thus providing a selectable button on the touch-sensitive display 118.

The adjustable setting may be, for example, a volume output such as volume of a notification, a brightness of the touch-sensitive display 118, or any other suitable setting. Alternatively, the adjustable setting may be a playback position within a file in a media player. For example, the adjustable setting may be a position within a song or a position within a video. The adjustable setting may be application dependent such that the adjustable setting may be identified based on the application running on the portable electronic device at the time the initiation of control is detected. The adjustable setting may be identified from more than one adjustable setting in the group of adjustable settings. The adjustable setting may be identified based on the location of the touch on the touch-sensitive display 118, for example. Thus, a volume control may be identified in response to detecting a touch at a first location associated with the volume and a video playback position may be identified in response to detecting a touch at a second location associated with the video.

The control mode is entered at 404 and an initial position of the adjustable setting may optionally be adjusted based on the starting position of the touch-sensitive display 118 relative to the physical keyboard 120 when initiation of control of the adjustable setting is detected. Thus, for example, a volume, brightness, or playback position may be initially adjusted based on the position of the touch-sensitive display 118 relative to the physical keyboard 120 at the time that initiation of control of the adjustable setting is detected.

In response to detecting movement of the touch-sensitive display 118 relative to the physical keyboard 120 at 406, the process continues at 408. The movement of the touch-sensitive display 118 relative to the physical keyboard 120 may be movement toward the first position in which the keyboard is not exposed or movement toward the second position in which the keyboard is exposed for use. Thus, the keyboard sensor 138 is utilized to detect any movement of the touch-sensitive display 118 relative to the physical keyboard 120 after initiation of control of the adjustable setting. The percentage or extent that the physical keyboard 120 is exposed is detected and changes in the percentage or extent that the physical keyboard 120 is exposed by movement of the touch-sensitive display 118 are detected.

A position of an adjustable setting within the range is adjusted based on the percentage or extent that the physical keyboard is exposed at 408. Thus, the position of the adjustable setting within the range is dependent on the location of the touch-sensitive display 118 relative to the physical keyboard 120 of the electronic device 100. For example, a volume or a brightness level may be adjusted by a percentage increase that is generally equivalent to the percentage or extent that the touch-sensitive display 118 is moved within the range of movement of the touch-sensitive display 118 relative to the physical keyboard 120. Alternatively, a playback position of a video or audio file may be changed by a percentage that is generally equivalent to the percentage or extent that the touch-sensitive display 118 is moved relative to the physical keyboard 120. Thus, the position of the adjustable setting may be adjusted in either direction along with movement of the touch-sensitive display 118 relative to the physical keyboard 120.

In response to detecting an end of control of the position of the adjustable setting at 410, the control mode is exited and adjustment of the position of the adjustable setting within the range in response to detecting movement of the touch-sensitive display 118 relative to the physical keyboard 120 is discontinued at 412. The end of control of the position of the adjustable setting may be detected, for example, when a touch, which may be a gesture or a touch on a key, is detected on the physical keyboard 120, or when a second touch is detected on the touch-sensitive display 118. Alternatively, the end of control of the position of the adjustable setting may be detected by detecting a pause in the movement of the touch-sensitive display 118 relative to the physical keyboard 120 such that the relative movement of the touch-sensitive display 118 is stopped for a period of time that meets or exceeds a threshold period of time. Alternatively, the end of control of the position of the adjustable setting may be detected when the electronic device 100 detects that a touch on the touch-sensitive display 118 is ended. Thus, a touch on the touch-sensitive display 118 may be utilized to enter the control mode and the electronic device 100 remains in the control mode until the same touch on the touch-sensitive display 118 is ended.

Further movement of the touch-sensitive display 118 relative to the physical keyboard 120 does not control the position of the adjustable setting after detecting the end of control of the position of the adjustable setting.

Rather than setting the position of the adjustable setting based on the position of the touch-sensitive display 118 when initiation of control of the adjustable setting is detected at 404, control of the position of the adjustable setting may begin when the touch-sensitive display 118 is moved to a position relative to the physical keyboard 120 that generally matches the initial position of the adjustable setting at the time initiation of control is detected. For example, the touch-sensitive display 118 may be utilized to display a first marker or indicator illustrating the initial position of the adjustable setting within the range and a second marker or indicator may be displayed to illustrate the position of the touch-sensitive display 118 relative to the physical keyboard 120. The touch-sensitive display 118 is then moved relative to the physical keyboard 120 and the second marker or indicator is moved along with movement of the touch-sensitive display 118, until the second marker or indicator is aligned with the first marker or indicator. When alignment is detected, control of the position of the adjustable setting begins. Thus, further movement of the touch-sensitive display 118 relative to the keyboard 120, after alignment of the first marker with the second marker, results in adjustment of the position of the adjustable setting.

Figures 5, 6:
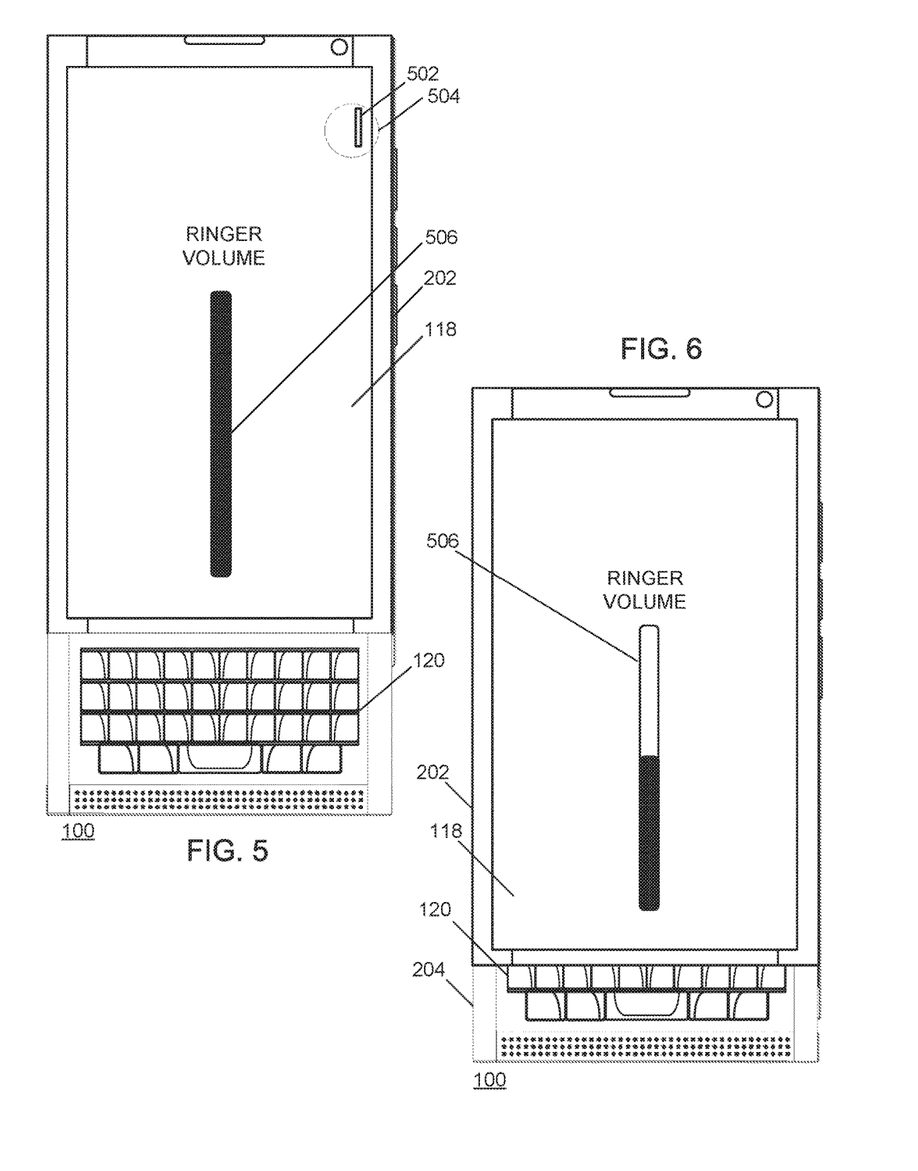
FIG. 5 and FIG. 6 illustrate an example of control of the electronic device of FIGS. 2 and 3 in accordance with the present disclosure.

Reference is made to FIG. 5 and FIG. 6 with continued reference to FIG. 4 to describe an example of control of the electronic device 100. In the present example, a volume control button 502 is displayed on the touch-sensitive display 118. The volume control button may be displayed, for example, in response to launching or executing an application, or may be displayed as part of a home screen. Alternatively, the volume control button may be a physical button in the display housing 202.

In response to detecting a touch illustrated by the circle 504 on the touch-sensitive display 118, at a location associated with the volume control button 502 at 402, the electronic device 100 enters a volume control mode and the initial position of the volume is adjusted at 404. The initial position of the volume is adjusted based on the starting position of the touch-sensitive display 118 relative to the physical keyboard 120 when initiation of control of the adjustable setting is detected. In the present example, the touch-sensitive display 118 is in the second position such that the physical keyboard 120 is entirely exposed for use when initiation of the volume control mode is detected and the initial position of the volume is adjusted to a maximum or 100% volume.

As the touch-sensitive display 118 is moved relative to the physical keyboard 120, toward the first position, the movement is detected at 406 and the volume is adjusted at 408. For the purpose of the present example, the touch-sensitive display 118 is moved relative to the physical keyboard 120, to about half way between the first position and the second position, as shown in FIG. 6 and thus, the volume is adjusted to a level that is about half way between the lower-most volume level and the upper-most volume level.

The movement of the touch-sensitive display 118 relative to the physical keyboard 120 is paused for a period of time that meets a threshold, with the touch-sensitive display 118 about half way between the first position and the second position. The pause in movement is detected at 410 and, in response, the control mode is exited and control of the volume with movement of the touch-sensitive display 118 relative to the physical keyboard 120 is discontinued at 412.

Thus, after setting the volume to the desired level by movement of the touch-sensitive display 118 relative to the physical keyboard 120, the relative movement is discontinued. After exiting the control mode, the touch-sensitive display 118 is moveable relative to the physical keyboard 120 without further adjustment of the volume to facilitate movement of the touch-sensitive display 118 to the second position for use of the physical keyboard 120 without adjusting the volume further.

As illustrated in the example of FIG. 5 and FIG. 6, the volume setting is moved along the volume control bar 506, generally in the same direction as the movement of the touch-sensitive display 118 relative to the physical keyboard 120. Thus, the volume setting is adjusted up and down in the orientation illustrated in FIG. 5 and FIG. 6, along with movement of the touch-sensitive display 118.

Figure 7:
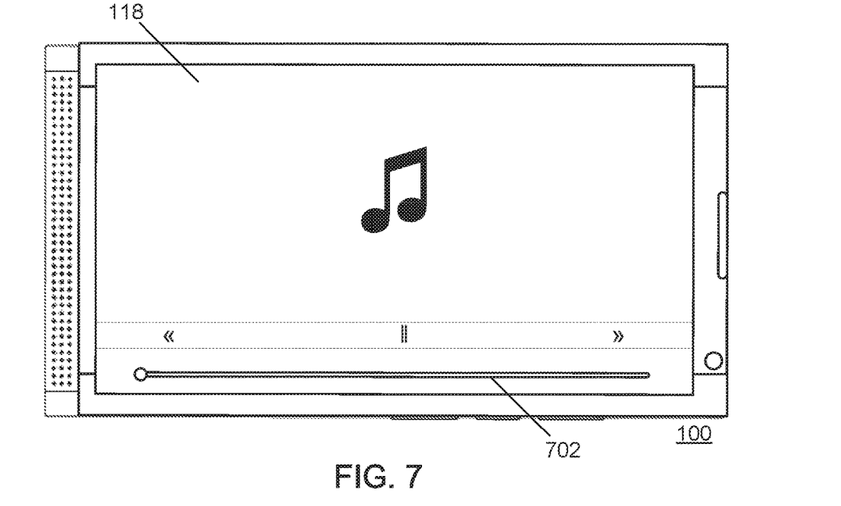
FIG. 7 and FIG. 8 illustrate another example of control of the electronic device of FIGS. 2 and 3 in accordance with the present disclosure.
Figure 8:
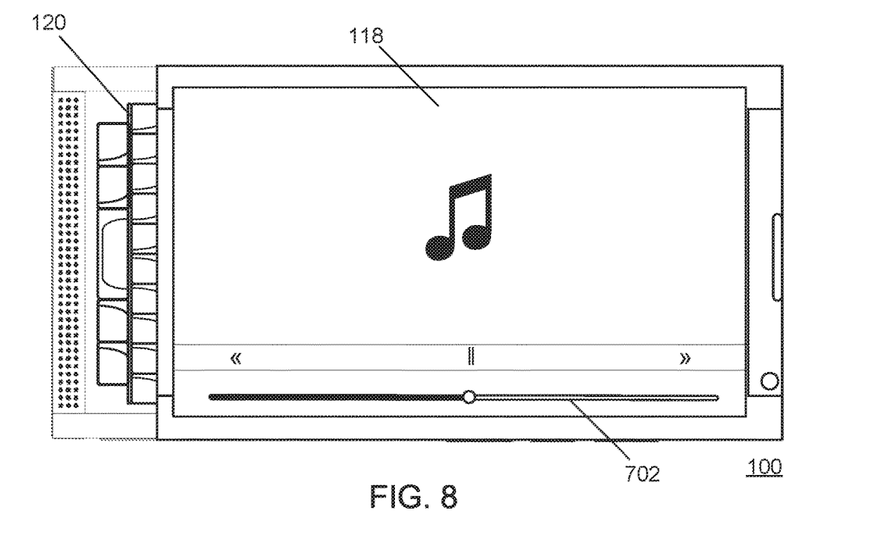

Another example of control of the electronic device is described herein with reference to FIG. 7. and FIG. 8 with continued reference to FIG. 4. In the present example, a media player is utilized to play an audio file. The position of playback of the audio file is illustrated in the slide control 702.

In response to detecting a touch on the touch-sensitive display 118, at a location associated with the slider control bar 702 at 402, the electronic device 100 enters a playback position control mode and the initial playback position of the media file is adjusted at 404. The initial playback position is adjusted based on the starting position of the touch-sensitive display 118 relative to the physical keyboard 120 when initiation of control of the adjustable setting is detected. In the present example, the touch-sensitive display 118 is in the first position and thus the keyboard is not exposed for use when initiation of playback position control mode is detected. In this example, the initial playback position of the audio file is adjusted to the end of the slider control bar 702, as illustrated in FIG. 7.

As the touch-sensitive display 118 is moved relative to the physical keyboard 120, toward the second position, the movement is detected at 406 and the playback position of the audio file is adjusted at 408. For the purpose of the present example, the touch-sensitive display 118 is moved relative to the physical keyboard 120, to about half way between the first position and the second position, as shown in FIG. 8 and thus, the playback position is adjusted to about half way along the slider control bar 702.

For the purpose of the present example, a touch on the physical keyboard 120 is detected at 410 and, in response, the control mode is exited at 412 and control of the playback position with movement of the touch-sensitive display 118 relative to the physical keyboard 120 is discontinued at 412.

Thus, after setting the playback position to the desired location by movement of the touch-sensitive display 118 relative to the physical keyboard 120, a touch on the physical keyboard is utilized to discontinue adjustment of the playback position. After exiting the control mode, the touch-sensitive display 118 may be moved relative to the physical keyboard 120 without further adjustment of the playback position to facilitate movement of the touch-sensitive display 118 into a desired position without adjusting the playback position further.

In the example of FIG. 7 and FIG. 8, the setting, or position, of the playback of the audio file is moved generally in the same direction as the movement of the touch-sensitive display 118 relative to the physical keyboard 120. Thus, the setting is adjusted side to side in the orientation illustrated in FIG. 7 and FIG. 8, along with movement of the touch-sensitive display 118.

Figures 9, 10:
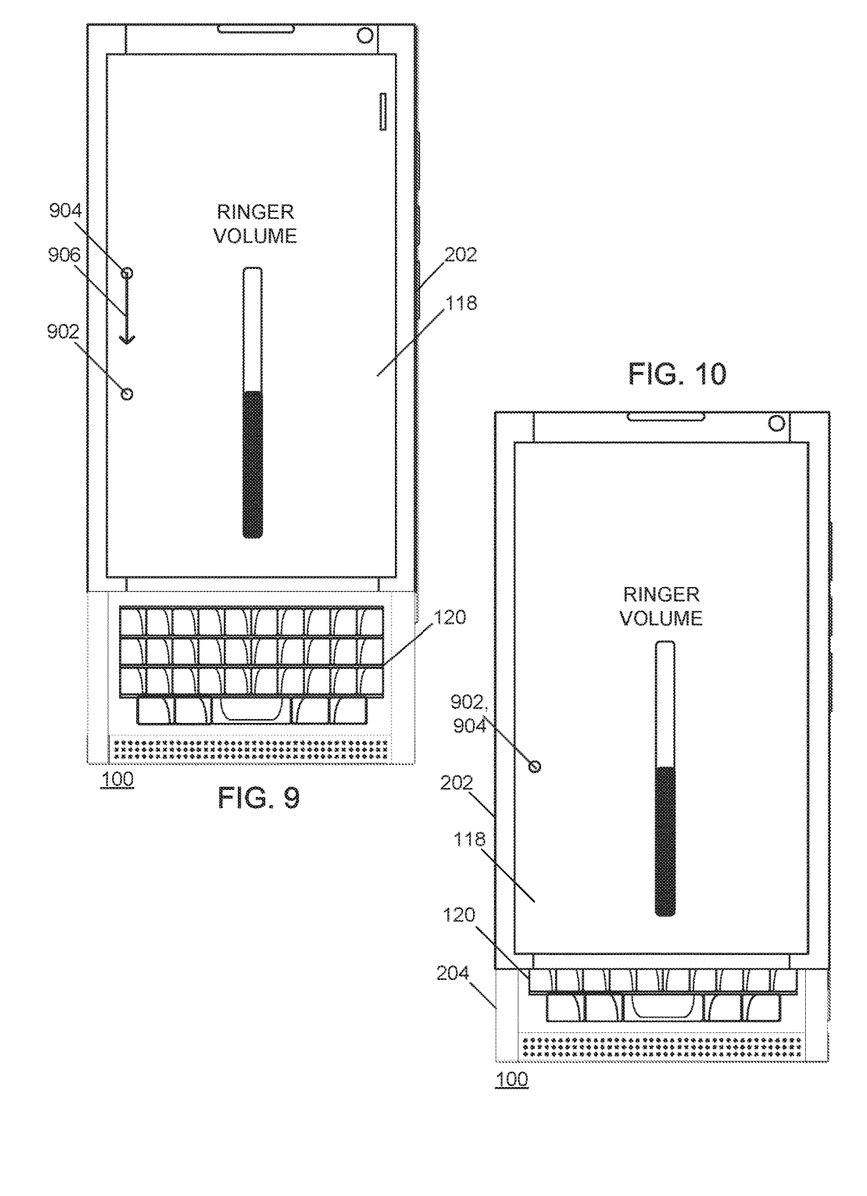
FIG. 9 and FIG. 10 illustrate yet another example of control of the electronic device of FIGS. 2 and 3 in accordance with the present disclosure.

Yet another example of control of the electronic device is described with reference to FIG. 9 and FIG. 10. As in the example described above with reference to FIG. 5 and FIG. 6, a volume control button is displayed on the touch-sensitive display 118.

In response to detecting a touch on the touch-sensitive display 118, at a location associated with the volume control button at 402, the electronic device 100 enters a volume control mode. In this example, however, the initial position of the volume is not adjusted based on the starting position of the touch-sensitive display 118 relative to the physical keyboard 120.

Instead, a first indicator 902 and a second indicator 904 are displayed on the touch-sensitive display 118. The first indicator 902 illustrates the initial position of the volume within the volume range. The second indicator 906 illustrates the position of the touch-sensitive display 118 relative to the physical keyboard 120. In the present example, an arrow 906 is shown to illustrate a direction of movement of the touch-sensitive display 118 to begin controlling the volume setting within the volume range. Other information may also be displayed to instruct or guide the user.

The touch-sensitive display 118 is then moved relative to the physical keyboard 120 and the second indicator 904 is moved along with movement of the touch-sensitive display 118, until the second indicator 904 is aligned with the first indicator 902. In response to detecting alignment of second indicator 904 with the first indicator 902, control of the position of the volume setting begins. Thus, further movement of the touch-sensitive display 118 relative to the keyboard 120, results in adjustment of the position of the volume setting within the range.

Thus, as the touch-sensitive display 118 is moved relative to the physical keyboard 120, the movement is detected at 406 and the volume is adjusted at 408. The remaining processes in the method are similar to those described above with reference to FIG. 4.

Advantageously, a position of an adjustable setting may be controlled by movement of the display relative to the keyboard. Thus, the use of physical keys to control such adjustable settings is unnecessary.

The scope of the claims should not be limited by the embodiments set forth in the examples, but should be given the broadest interpretation consistent with the description as a whole.

What is claimed is:

1. A method of controlling an electronic device having a display moveable relative to a physical keyboard, between a first position in which the physical keyboard is exposed for use and a second position in which the physical keyboard is not exposed, the method comprising:
    in response to detecting initiation of control of a position of an adjustable setting within a range, entering a control mode at the electronic device, the adjustable setting comprising one of a volume output setting, a display brightness setting, or a playback position of a media file in a media player;
    in response to detecting movement of the display relative to the physical keyboard of the electronic device, adjusting the position of the adjustable setting within the range and thereby adjusting the one of the volume output setting, the display brightness setting, or the playback position of the media file in the media player based on the movement of the display relative to the physical keyboard;
    in response to detecting an end of control of the position of the adjustable setting within a range, exiting the control mode such that adjustment of the position of the adjustable setting within the range in response to detecting movement of the display relative to the physical keyboard is discontinued.

2. The method according to claim 1, wherein the position of the adjustable setting within the range comprises a volume setting within a volume range of the electronic device.

3. The method according to claim 1, wherein the position of the adjustable setting within the range comprises a playback position within a file in a media player.

4. The method according to claim 1, wherein detecting initiation of control of the position of the adjustable setting comprises detecting a touch at a location on the display.

5. The method according to claim 1, wherein detecting the end of control of the position of the adjustable setting within the range comprises detecting a touch on the physical keyboard.

6. The method according to claim 1, wherein detecting the end of control of the position of the adjustable setting within the range comprises detecting stoppage of the movement of the display relative to the physical keyboard for a threshold period of time.

7. The method according to claim 1, wherein the position of the adjustable setting within the range is dependent on the location of the display relative to the physical keyboard of the electronic device.

8. The method according to claim 1, comprising, in response to detecting initiation of the control of the position of the adjustable setting, adjusting an initial position of the adjustable setting within the range based on an initial position of the display relative to the physical keyboard.

9. The method according to claim 1, wherein the adjustable setting is dependent on an application running on the electronic device when initiation of control is detected.

10. A method of controlling an electronic device having a display moveable relative to a physical keyboard, between a first position in which the physical keyboard is exposed for use and a second position in which the physical keyboard is not exposed, the method comprising:
    in response to detecting initiation of control of a position of an adjustable setting within a range, entering a control mode at the electronic device, the adjustable setting comprising one of a volume output setting, a display brightness setting, or a playback position of a media file in a media player;
    in response to detecting movement of the display relative to the physical keyboard of the electronic device, adjusting the position of the adjustable setting within the range and thereby adjusting the one of the volume output setting, the display brightness setting, or the playback position of the media file in the media player based on the movement of the display relative to the physical keyboard,
    wherein the setting is adjusted within the range to move the setting in a first direction as the display is moved toward the second position and the setting is adjusted within the range to move the setting in a second direction, opposite the first direction, as the display is moved toward the first position.

11. A non-transitory computer-readable storage medium having computer-readable code executable by at least one processor of the portable electronic device to perform the method according to claim 1.

12. An electronic device comprising:
    a physical keyboard;
    a display to display information thereon, wherein the display is moveable relative to the physical keyboard, between a first position in which the physical keyboard is exposed for use and a second position in which the physical keyboard is not exposed;
    a sensor for detecting a position of the display relative to the physical keyboard;
    a processor coupled to the display, the physical keyboard, and the sensor and operable to
        enter a control mode in response to detecting initiation of control of a position of an adjustable setting within a range, the adjustable setting comprising one of a volume output setting, a display brightness setting, or a playback position of a media file in a media player; and
        adjust the position of the adjustable setting within the range in response to detecting movement of the display relative to the physical keyboard of the electronic device and thereby adjusting the one of the volume output setting, the display brightness setting, or the playback position of the media file in the media player based on the movement of the display relative to the physical keyboard,
    wherein the processor is operable to exit the control mode in response to detecting an end of control of the position of the adjustable setting within a range, such that adjustment of the position of the adjustable setting within the range in response to detecting movement of the display relative to the physical keyboard is discontinued.

13. The electronic device according to claim 12, wherein the position of the adjustable setting within the range comprises a volume setting within a volume range of the electronic device.

14. The electronic device according to claim 12, wherein the position of the adjustable setting within the range comprises a playback position within a file in a media player.

15. The electronic device according to claim 12, wherein the display comprises a touch-sensitive display and initiation of control of the position of the adjustable setting is detected when a touch is detected on the display.

16. The electronic device according to claim 12, wherein the position of the adjustable setting within the range is dependent on the location of the display relative to the physical keyboard of the electronic device.

17. The electronic device according to claim 12, wherein, in response to initiation of the control of the position of the adjustable setting, an initial position of the adjustable setting within the range is adjusted based on the initial position of the display relative to the physical keyboard.

18. The electronic device according to claim 12, wherein the setting is adjustable within the range to move the setting in a first direction as the display is moved toward the second position and the setting is adjustable within the range to move the setting in a second direction, opposite the first direction, as the display is moved toward the first position.

* * * * *